United States Patent Office 2,822,282
Patented Feb. 4, 1958

2,822,282

METHOD OF CONVERTING NON-HOMOGENEOUS ASPHALT TO HOMOGENEOUS ASPHALT AND PRODUCT

Leo Garwin, Oklahoma City, Okla., assignor to Kerr-McGee Oil Industries, Inc., a corporation of Delaware No Drawing. Application September 29, 1955
Serial No. 537,571

11 Claims. (Cl. 106—232)

This invention relates to a novel method of converting a normally non-homogeneous bituminous material to a homogeneous bituminous material, as measured by the Oliensis spot test, and to the product thus produced.

The Oliensis spot test (ASTM Proceedings, part II, vol. 39 (1936), page 506 et seq.) has been widely incorporated into specifications of bituminous products, particularly road oils and asphalts, as an index of homogeneity. Specifications for these materials generally require that they be homogeneous as indicated by a negative Oliensis spot test, and as a result of this requirement non-homogeneous bituminous materials, as indicated by a positive Oliensis spot test, are sold at an economic disadvantage.

The non-homogeneous petroleum asphalts may be divided into two general classes: (1) petroluem asphalts derived by cracking (either conventional or under oxidizing conditions); and (2) natural petroleum asphalts derived from crudes where the asphaltene to resin ratio is such as to give non-homogeneous asphalts. The foregoing two classes of non-homogeneous asphalts each exhibit the same positive reaction to the Oliensis spot test, but their constituents differ in one respect. The cracked asphalts contain synthetic asphaltenes and resins, while the asphalts derived directly from crudes having an asphaltene to resin ratio such as to give a non-homogeneous asphalt are composed of natural asphaltenes, resins and oils.

Asphalt technologists have recognized that the foregoing two classes of non-homogeneous asphalts exhibit a positive Oliensis spot test due to the inability of the resins to completely peptize the asphaltenes in the oil, and have proposed converting these materials to homogeneous asphalts by various treatments. One such treatment proposed heretofore comprises the addition of either natural petroleum resins derived from a homogeneous asphalt or synthetic petroleum resins derived from cracked asphalts. The prior art has further taught that resins derived from a naturally non-homogeneous asphalt are appreciably different in composition from resins derived from a naturally homogeneous asphalt, and that even if these resins should have the ability to render non-homogeneous asphalt homogeneous, the resulting homogeneous asphalt would still be undesirable due to its being less stable to oxidation, weathering, etc.

Thus, the prior art teaches that only resins derived from cracked bituminous products, i. e., synthetic resins, and resins from negative asphalts have the ability to convert non-homogeneous bitumens to suitable homogeneous bitumens, and excludes from use for this purpose those natural resins derived from asphalts which are non-homogeneous. However, I have found that natural resins derived from non-homogeneous asphalts are equally effective in rendering non-homogeneous asphalts homogeneous, and that a homogeneous asphalt resulting therefrom is as desirable as if obtained from the resins taught by the prior art.

It is an object of the invention to provide a homogeneous asphalt having a negative Oliensis spot test from a non-homogeneous petroleum asphalt normally having a positive Oliensis spot test.

A further object of the invention is to provide a novel method of converting non-homogeneous petroleum asphaltic materials to homogeneous asphaltic materials.

A still further object of the invention is to provide a method for correcting the homogeneity of non-homogeneous petroleum asphaltic materials by removing a portion of the asphaltenes therefrom.

A still further object of the invention is to provide a method for converting non-homogeneous petroleum asphaltic material to homogeneous asphaltic material by the addition thereto of natural resins derived from a non-homogeneous petroleum asphalt.

Other objects and the attendant advantages of the present invention will become apparent to those skilled in the art as the invention is better understood by reference to the following detailed description.

In accordance with the foregoing objects, I have discovered that if the asphaltene to resin ratio in a non-homogeneous petroleum asphalt is adjusted to a value not greater than 0.60, the resulting product is a homogeneous asphalt which will give a negative Oliensis spot test. This asphaltene to resin ratio is independent of the source of the resin, provided the resins are derived from cracked asphalts, or either homogeneous or non-homogeneous uncracked asphalts. However, if the resins are derived from gilsonite, the asphaltene to resin ratio is different. Generally, I have found the resins derived from gilsonite are not as effective as peptizing agents for asphaltenes as petroleum resins, i. e., synthetic resins derived from cracked bituminous materials, or resins derived from naturally occurring homogeneous or non-homogeneous asphalts. The asphaltene to gilsonite resin ratio is less than 0.75 in a homogeneous asphalt derived from non-homogeneous Col-Tex asphalt.

I have further discovered that if a petroleum resin or a resin-rich fraction derived from a non-homogeneous petroleum asphalt having a positive Oliensis spot test is blended with a non-homogeneous petroleum asphalt, likewise having a positive Oliensis spot test, the resulting asphaltic blend will be homogeneous and will give a negative Oliensis spot test provided the asphaltene to resin ratio is adjusted to a value not greater than 0.60.

For the purpose of illustrating my invention, an uncracked non-homogeneous asphalt was obtained from the Col-Tex Refinery at Colorado City, Texas. This naturally non-homogeneous asphalt was then treated with pentane at a temperature sufficient to precipitate a liquid asphaltene phase and the resulting liquid asphaltenes separated from the pentane layer. Then the temperature was raised to a value which is at least within the para-critical region, wherein the para-critical region extends from 50° F. below the critical temperature of the solvent to the critical temperature of the solvent, or higher, thereby causing the resins to separate from the oils. The resins were then drawn off and obtained in a form substantially free of asphaltenes and oil. The foregoing process for separating asphalt into its components is fully described in my copending application Serial No. 377,201, filed August 28, 1953, and while this process is presently preferred, other suitable separation processes are well known in the art.

The resins obtained by the above described treatment of the Col-Tex non-homogeneous asphalt were blended with like Col-Tex non-homogeneous asphalt having a positive Oliensis spot test to give various ratios of asphaltenes to resins. The results of tests made on these blends of asphalts are recorded in Table I hereinbelow:

Table I

| | Blend Composition, Percent by Weight | | | | | | | | | |
|---|---|---|---|---|---|---|---|---|---|---|
| Asphalt | 100 | | 61 | 70 | 80 | 86 | 90 | | 50 | 70 |
| Resins | | 100 | 39 | 30 | 20 | 14 | 10 | | | |
| Resins–oils | | | | | | | | 100 | 50 | 30 |
| Tests on Blend: | | | | | | | | | | |
| Softening Point, °F | 116 | 154 | | | | | | | | |
| Pen. at 77° F | 77 | 0–5 | | | | | | | | |
| Asphaltenes, Percent | 22.7 | 0 | 13.9 | 15.9 | 18.2 | 19.5 | 20.4 | 0 | 11.3 | 15.9 |
| Resins, Percent | 21 | 100 | 51.8 | 44.7 | 36.8 | 32.1 | 28.9 | 29.5 | 25.3 | 23.6 |
| Oils, Percent | 56.3 | 0 | 34.3 | 39.4 | 45.0 | 48.4 | 50.7 | 70.5 | 63.4 | 60.5 |
| Asphaltene/Resin Ratio | 1.1 | 0 | 0.27 | 0.35 | 0.50 | 0.61 | 0.69 | 0 | 0.45 | 0.67 |
| Oliensis Spot— | | | | | | | | | | |
| (a) | Pos. | Neg. | Neg. | Neg. | Neg. | Neg. | Pos. | Neg. | Neg. | Pos. |
| (b) | Pos. | Neg. | Neg. | Neg. | Neg. | Pos. | Pos. | Neg. | Neg. | Pos. |

(Oliensis spot (a) and (b) refers to 0 and 24 hour's standing in solvent, respectively.)

It may be observed from Table I that if the asphaltene to resin ratio is adjusted to a value not greater than 0.60, the resulting asphaltic blend is a homogeneous asphalt and will give a negative Oliensis spot test. It is apparent from the foregoing, contrary to the teachings of the prior art, that resins derived from non-homogeneous asphalts having a positive Oliensis spot test are highly effective and useful in converting non-homogeneous asphalts to suitable homogeneous asphalts.

For the purpose of illustrating a modification of my invention, a like sample of uncracked non-homogeneous asphalt having a positive Oliensis spot test was obtained from the Col-Tex Refinery. This sample of naturally non-homogeneous asphalt was then treated with pentane at a temperature sufficient to precipitate a liquid asphaltene phase in the manner disclosed in my copending application Serial No. 377,201, filed August 28, 1953. A quantity of the resulting liquid asphaltenes sufficient to give an asphaltene to resin ratio of less than 0.60 was then separated from the pentane layer and discarded. The remaining asphaltic blend was then recovered and tested by the Oliensis spot test.

Asphalts prepared by the foregoing method gave Oliensis spot test results identical with the data tabulated in Table I. It is thus apparent that if a sufficient quantity of asphaltene is removed from a naturally non-homogeneous asphalt to give an asphaltene to resin ratio not greater than 0.60, such treatment is as effective in producing a homogeneous asphalt therefrom as if resins had been added to correct the asphaltene to resin ratio. While the above described method for separation of a portion of the asphaltenes from the remaining components of asphalt is presently preferred, other suitable separation processes are well known in the art.

Suitable non-homogeneous asphalts for the purpose of this invention may be obtained from crudes such as Col-Tex crude, when the residuum is either of the long or short type. The homogeneous asphalts produced therefrom and in accordance with the invention are as desirable in all respects as naturally homogeneous asphalts, or homogeneous asphalts produced by prior art methods.

The foregoing description of the present invention is for the purpose of illustration only and is not limiting to the scope thereof which is set forth in the appended claims.

What is claimed is:

1. The method of converting a non-homogeneous asphalt to a homogeneous asphalt comprising the step of incorporating a petroleum resin derived from a naturally non-homogeneous petroleum asphalt with a non-homogeneous petroleum asphalt in quantities sufficient to produce a homogeneous asphalt therefrom.

2. The method of claim 1, wherein the amount of resin incorporated with the non-homogeneous asphalt is sufficient to produce a homogeneous asphalt having an asphaltene to resin ratio not greater than 0.60.

3. The method of converting a non-homogeneous asphalt to a homogeneous asphalt comprising the step of removing asphaltenes from a non-homogeneous petroleum asphalt in quantities sufficient to produce a homogeneous asphalt therefrom.

4. The method of claim 3, wherein the quantity of asphaltenes removed from the non-homogeneous asphalt is sufficient to produce a homogeneous asphalt having an asphaltene to resin ratio not greater than 0.60.

5. The method of converting a non-homogeneous asphalt to a homogeneous asphalt comprising the step of reducing the asphaltene to resin ratio of a non-homogeneous petroleum asphalt to a value sufficient to produce a homogeneous asphalt therefrom, the resin content of the homogeneous asphalt thus produced being derived from a naturally non-homogeneous petroleum asphalt.

6. The method of claim 5, wherein the asphaltene to resin ratio is reduced by the removal of asphaltenes from the non-homogeneous asphalt.

7. The method of claim 5, wherein the asphaltene to resin ratio is reduced by incorporating resin with the non-homogeneous asphalt.

8. The method of converting a non-homogeneous asphalt to a homogeneous asphalt comprising the step of reducing the asphaltene to resin ratio of a non-homogeneous petroleum asphalt to a value sufficient to produce a homogeneous asphalt therefrom having an asphaltene to resin ratio not greater than 0.60, the resin content of the homogeneous asphalt thus produced being derived from a naturally non-homogeneous petroleum asphalt.

9. The method of claim 8, wherein the asphaltene to resin ratio is reduced by the removal of asphaltenes from the non-homogeneous asphalt.

10. The method of claim 8, wherein the asphaltene to resin ratio is reduced by incorporating petroleum resin with the non-homogeneous asphalt.

11. The homogeneous asphalt produced by the method of claim 8.

References Cited in the file of this patent

UNITED STATES PATENTS

| | | |
|---|---|---|
| 2,658,026 | MacLauren et al. | Nov. 3, 1953 |
| 2,687,989 | Goodwin | Aug. 31, 1954 |
| 2,690,420 | Mack | Sept. 28, 1954 |